US006945585B1

(12) United States Patent
Liu et al.

(10) Patent No.: US 6,945,585 B1
(45) Date of Patent: Sep. 20, 2005

(54) VEHICLE SEAT ATTACHMENT LATCH ASSEMBLY

(75) Inventors: Hsing Lung Lewis Liu, Novi, MI (US); Karl A. Murphy, Novi, MI (US)

(73) Assignee: Porter Group, LLC, Novi, MI (US)

(*) Notice: Subject to any disclaimer, the term of this patent is extended or adjusted under 35 U.S.C. 154(b) by 0 days.

(21) Appl. No.: 10/814,922

(22) Filed: Mar. 31, 2004

(51) Int. Cl.[7] .................................................. B60N 2/02
(52) U.S. Cl. ............................... 296/65.03; 296/65.01; 292/216; 297/336
(58) Field of Search .......................... 296/65.03, 65.09, 296/65.05, 65.01, 63, 65.17; 297/378.12, 297/378.13, 378.11, 341, 336, 325; 29/436; 292/216

(56) References Cited

U.S. PATENT DOCUMENTS

| | | | | |
|---|---|---|---|---|
| 4,865,377 A * | 9/1989 | Musser et al. | ........... | 296/65.03 |
| 4,928,374 A * | 5/1990 | Allen | .......................... | 29/436 |
| 5,730,480 A * | 3/1998 | Takamura | ................... | 292/217 |
| 6,012,747 A * | 1/2000 | Takamura et al. | .......... | 292/216 |
| 6,161,890 A * | 12/2000 | Pesta et al. | .............. | 296/65.03 |
| 6,293,620 B1 * | 9/2001 | Fast | ........................... | 297/325 |
| 6,345,867 B1 * | 2/2002 | Hellrung et al. | ......... | 296/65.03 |
| 6,354,663 B1 * | 3/2002 | Zhang et al. | ............... | 297/336 |
| 6,629,710 B1 * | 10/2003 | Shafry et al. | ............... | 292/216 |
| 6,698,837 B2 * | 3/2004 | Pejathaya et al. | ........ | 296/65.03 |
| 6,729,689 B2 * | 5/2004 | Habedank | ................... | 297/335 |
| 6,733,078 B1 * | 5/2004 | Zelmanov | ................ | 296/65.01 |
| 6,820,912 B1 * | 11/2004 | Lavoie | .................... | 296/65.03 |
| 6,863,330 B2 * | 3/2005 | Yokoyama et al. | ...... | 296/35.03 |

* cited by examiner

*Primary Examiner*—Kiran B. Patel
(74) *Attorney, Agent, or Firm*—Brooks Kushman P.C.

(57) ABSTRACT

A vehicle seat attachment latch assembly (24) includes a latch (40) mounted for movement between latched and unlatched positions with respect to a striker (29) to secure and selectively release a vehicle seat with respect to a vehicle body. A latching wedge (48) is mounted on the latch (40) for movement therewith and for movement with respect thereto in cooperation with a bias (54) provided by a first spring (58) that moves a wedging surface 52 of the latching wedge (48) into wedging contact with the striker (29) with the latch (40) in its latched position in order to provide a rattle free attachment. A locking pawl (70) and a spring (78) cooperate to hold the latch (40) in its latched position or permit release thereof for movement to the unlatched position where the striker (29) is released.

10 Claims, 2 Drawing Sheets

VEHICLE SEAT ATTACHMENT LATCH ASSEMBLY

BACKGROUND OF THE INVENTION

1. Field of the Invention

This invention relates to an attachment latch assembly for securing and selectively releasing a vehicle seat with respect to a vehicle body.

2. Background Art

Attachment latch assemblies have previously been utilized to secure a vehicle seat with respect to a vehicle body and to selectively permit the seat to be released so that the seat can be moved or stored so as to permit the vehicle to provide a cargo area for transportation as opposed to carrying of passengers. Such latch assemblies have previously utilized rubber components so as to provide the attachment without rattling that would otherwise be caused by tolerances involved with the metal to metal contact between such latch assemblies and a striker to which each latch assembly is secured to provide the attachment. Normally the latch assemblies are mounted on the associated vehicle seat and the strikers are mounted on the vehicle body; however, the reverse positioning is also possible with the latch assemblies mounted on the vehicle body and the strikers mounted on the vehicle seat.

SUMMARY OF THE INVENTION

An object of the present invention is to provide an improved vehicle seat attachment latch assembly for securing and selectively releasing a vehicle seat with respect to a vehicle body with the securement provided by a rattle free attachment.

In carrying out the above object, the vehicle seat latch assembly of the invention secures and selectively releases a member of a vehicle seat with respect to a member of a vehicle body and includes an attachment bracket that is attachable to one of the members. A latch of the latch assembly is mounted on the attachment bracket for movement between: (a) a latched position where the latch captures a striker mounted on the other member to secure the vehicle seat with respect to the vehicle body; and (b) an unlatched position where the striker is released from the latch so the vehicle seat can be moved with respect to the vehicle body. A latching wedge of the latch assembly is mounted on the latch for movement therewith and for movement with respect thereto, and the latching wedge has a wedge surface for contacting the striker when the latch is in its latching position. A resilient bias of the latch assembly biases the wedge surface of the latching wedge into wedging contact with the striker with the latch in its latching position to provide a rattle free attachment of the seat to the vehicle body.

The latch of the latch assembly has a pivotal connection for mounting thereof on the attachment bracket for pivotal movement between its latched and unlatched positions. The resilient bias is provided by a spring that extends around this pivotal connection of the latch and has a first arm that extends to the latch and also has a second arm that extends to the latching wedge to provide the biasing of the wedge surface of the latching wedge into the wedging contact with the striker. Furthermore, the latch and latching wedge include a pin and slot connection and a projection that cooperate to mount the latching wedge on the latch for movement with respect to the latch.

The latch assembly also includes a locking pawl mounted on the attachment bracket for movement between a locking position for holding the latch in its latched position and a released position for releasing the latch for movement from its latched position to its unlatched position. Another pivotal connection mounts the locking pawl on the attachment bracket for pivotal movement between its locking and released positions. A second spring biases the locking pawl toward its locking position. This second spring extends between the locking pawl and the latch and also biases the latch toward its unlatched position.

The latch assembly also includes another attachment bracket that is attachable to the first mentioned attachment bracket to cooperate therewith in providing an attachment bracket assembly. Each of the attachment brackets has a flange spaced from the flanges of the other bracket, and the latch and latching wedge are mounted between the spaced flanges of the attachment brackets. The attachment brackets are preferably mounted on a member of the vehicle seat and the striker is mounted on a member of the vehicle body.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
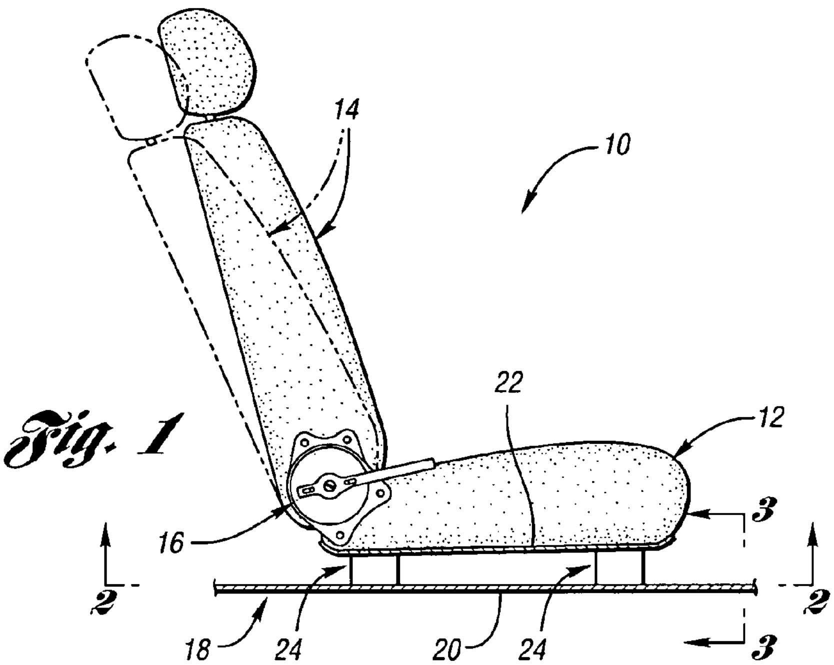
FIG. 1 is a side elevational view of a vehicle seat that is secured and selectively released from an associated vehicle body by attachment latch assemblies constructed in accordance with the present invention.

With reference to FIG. 1, a vehicle seat generally indicated by 10 includes a seat cushion 12 and a seat back 14 that may be mounted on the cushion 12 by a recliner 16 for reclining movement as illustrated by the solid and phantom line positions. A partially indicated vehicle 18 includes a member 20 which is actually a vehicle floor pan on which the vehicle seat is mounted. The seat cushion 12 of the vehicle seat includes a member 22 which may be a vehicle seat cushion pan or a seat frame member. The seat member 22 is secured and selectively released from the vehicle by vehicle seat attachment latch assemblies 24 that are each constructed in accordance with the present invention as is hereinafter more fully described.

Figure 2:
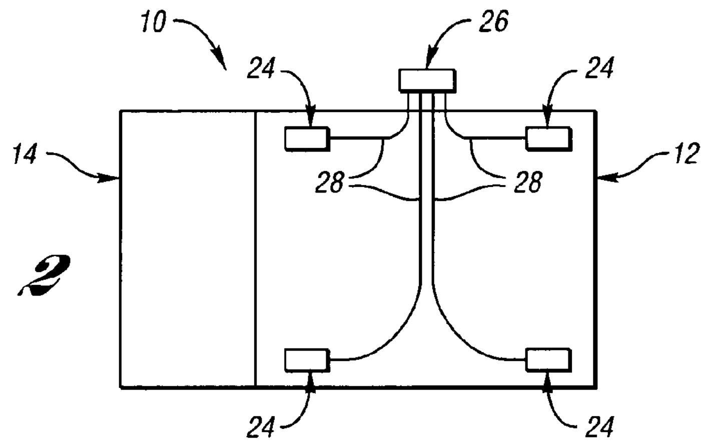
FIG. 2 is a bottom plan view taken along the direction of line 2—2 in FIG. 1 to illustrate the positioning of the latch assemblies with respect to the vehicle seat.

With reference to FIG. 2, the vehicle seat 10 is illustrated as having four of the attachment latch assemblies 24 mounted at the corners of an individual seat. However, it should be appreciated that the latch assemblies can also be utilized with a bench type seat for holding two or more passengers and that it is possible to use less or more than the four latch assemblies illustrated in providing vehicle seat attachment and selective release with respect to the vehicle body. For example, the attachment latches can be utilized to permit seat folding for storage that provides a cargo floor with the seat within the vehicle and can also be utilized to remove the seat from the vehicle to provide cargo capacity. As illustrated, a release handle 26 has suitable connections such as the cables 28 illustrated to provide the simultaneous release of all of the latch assemblies 24, as is hereinafter more fully described, so as to permit the movement of the seat with respect to the vehicle body.

Figure 3:
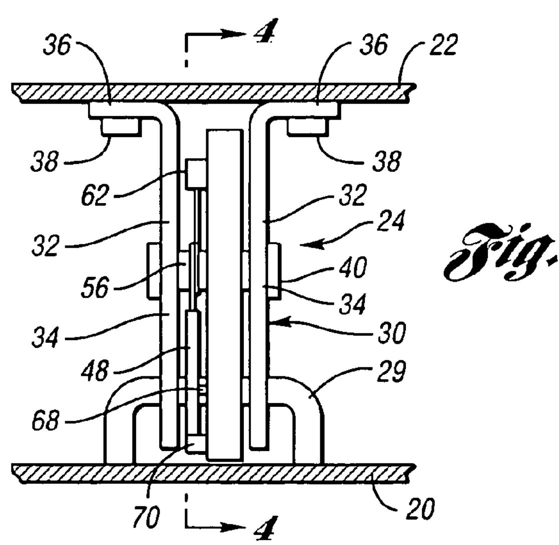
FIG. 3 is a view of one of the latch assemblies taken along the direction of line 3—3 in FIG. 1 to illustrate the construction of the latch assembly.

With reference to FIG. 3, each latch assembly 24 is operable to secure and selectively release a striker 29 mounted on the vehicle body member. The latch assembly 24 includes an attachment bracket assembly 30 that is mounted on the vehicle seat member 22. While the mounting of the attachment bracket assembly 30 on the vehicle seat member 22 and the striker 29 on the vehicle body member 20 is the preferred construction, it should be appreciated that it is also possible to reverse the respective positions of these components. However, the mounting of the latch assembly 24 on the vehicle seat member 22 is preferred since upon detachment of the seat, the striker 29 provides less of a projection than the latch assembly. As illustrated, the attachment bracket assembly 30 includes a pair of attachment brackets 32 each of which includes a flange 34 spaced from the flange of the other attachment bracket. Each attachment bracket 32 also includes a securement flange portion 36 that is secured by a suitable fastener 38 to the vehicle seat member 22. As is hereinafter more fully described, the components of the latch 24 are mounted between the flanges 34 of the pair of attachment brackets 32. While it is possible to provide the latch assembly utilizing only a single attachment bracket, the construction illustrated with a pair of the attachment brackets is preferred since the components are then better supported and enclosed from each side as opposed to being partially exposed.

Figure 4:
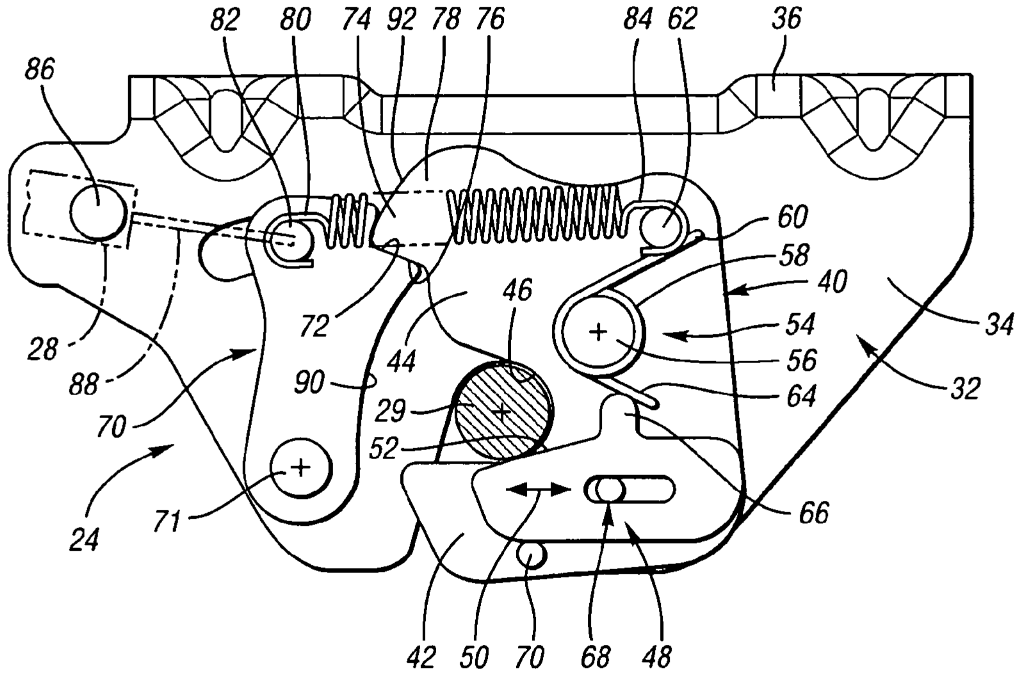
FIG. 4 is a view of the latch assembly taken along the direction of line 4—4 in FIG. 3 and is shown with a latch thereof in a latched position and with a locking pawl of the latch assembly shown in a locking position holding the latch in its latched position to secure a striker in order to secure the associated vehicle seat with respect to the vehicle body.
Figure 5:
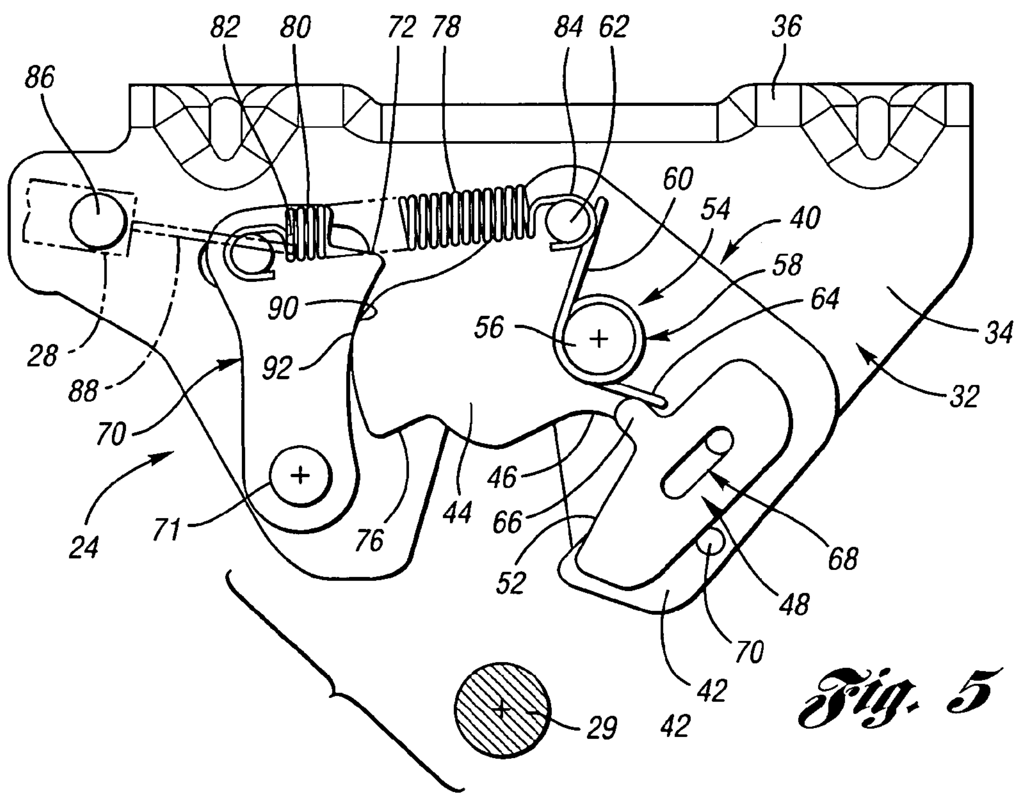
FIG. 5 is a view taken in the same direction as FIG. 4 but showing the locking pawl in its released position and the latch in its unlatched position so as to release the striker and permit movement of the vehicle seat with respect to the vehicle body.

As illustrated in FIGS. 4 and 5, the latch assembly includes a latch 40 that is mounted on the attachment brackets 32 for movement between the latched position of FIG. 4 and the unlatched position of FIG. 5. This latch 40 has a bifurcated shape including a pair of locking portions 42 and 44 that cooperate to define a locking notch 46 for receiving the striker 29. In the latched position of FIG. 4, the latch 40 captures the striker 29 to secure the vehicle seat with respect to the vehicle body. Movement of the latch 40 to the unlatched position of FIG. 5 as is hereinafter more fully described releases the striker 29 so that the seat can be moved with respect to the vehicle body as previously described.

As best shown in FIG. 4, the latch assembly 24 also includes a latching wedge 48 that is mounted on the latch 40 for movement therewith and is also mounted for movement with respect to the latch as illustrated by arrows 50. The latching wedge 48 has a wedging surface 52 for contacting the striker 29 when the latch 40 is in its latching position. A resilient bias 54 biases the latching wedge 48 toward the left as illustrated in FIG. 4 so that its wedging surface 52 is moved into wedging contact with the striker 29 with the latch in its latching position to provide a rattle free attachment of the seat to the vehicle body. With this construction, the rattle free attachment is insured throughout the useful lifetime of the latch.

As illustrated in both FIGS. 4 and 5, the latch 40 has a pivotal connection 56 provided by a pin that extends between the flanges 34 of the attachment brackets 32 shown in FIG. 3. This pivotal connection 56 thus mounts the latch 40 for pivotal movement between its latched position of FIG. 4 where the striker is received within the notch 46 and the unlatched position of FIG. 5 where the striker is released. With the latch 40 pivotally positioned in its latched position as shown in FIG. 4, the latching wedge 48 is biased into wedging contact with the striker 29 as mentioned above so as to provide the rattle free attachment.

As also shown in FIGS. 4 and 5, the resilient bias 54 is constructed as a spring 58 that extends around the pivotal connection 56 of the latch 40 and has a first arm 60 that extends to the latch at a projection 62 thereof. This spring 54 also has a second arm 64 that extends to the latching wedge 48 at a projection 66 of the latching wedge. The spring arms 60 and 64 are biased away from each other to increase the acute angle therebetween as illustrated in FIG. 4 so that the latching wedge 48 is biased toward the left into the wedging contact with the striker 29 so as to provide the rattle free attachment as previously described. The latch 40 and latching wedge 48 include a pin and slot connection 68 and a projection 66 to cooperate in mounting the latching wedge 48 for its movement with respect to the latch 40. The pin and slot connection 68 thus limits the extent of the movement as the pin reaches the opposite ends of the slot.

As also shown in FIGS. 4 and 5, the latch includes a locking pawl 70 mounted on the flanges 34 of the pair of attachment brackets 32 for movement between a locking position shown in FIG. 4 and a released position shown in FIG. 5. More specifically, a pivotal connection 71 supports the locking pawl 70 on the attachment bracket flanges 34 for pivotal movement between its locking and released positions. In the locking position of FIG. 4, a locking surface 72 of the locking pawl 70 engages a locking portion 74 of the latch 40 at a locking surface 76 thereof so as to maintain the latch in its latched position. Movement of the locking pawl 70 in a counterclockwise direction from the locking position of FIG. 4 disengages its locking surface 72 from the locking surface 76 of the latch locking portion 74 to permit the latch to move to its unlatched position of FIG. 5 and thereby release the striker 29 as previously described. A second spring 78 biases the locking pawl toward its locking position. More specifically, this second spring 78 extends between the locking pawl 70 and the latch 40 and is in tension so as to bias the latch toward its unlatched position of FIG. 5 as well as biasing the locking pawl 70 toward its locking position. This second spring 78 has a first end 80 that is attached to a projection 82 on the locking pawl 70 and has a second end 84 that is secured to the projection 62 of the latch where the arm 60 of spring 58 biases the latch.

The release cable 28 previously described is connected to an attachment 86 on the attachment bracket flange 34 and has a central actuating wire 88 that extends to the projection 82 on the locking pawl 70 to move the pawl locking counterclockwise against the bias of spring 78. The latch assembly 24 remains in its latched condition until the pivoting of the pawl is sufficient for the pawl locking surface 72 to disengage the latch locking surface 76, whereupon the latch 40 pivots counterclockwise from its latched position of FIG. 4 to its unlatched position of FIG. 5. A concave positioning surface 90 of the locking pawl 70 then engages a convex positioning surface 92 of the latch 40 to position the latch and locking pawl with respect to each other in cooperation with the bias of spring 78.

When the seat is moved downwardly for reattachment to the vehicle, striker 29 contacts the latch 40 and pivots the latch clockwise from the unlatched position of FIG. 5 to the latched position of FIG. 4. As the latch locking surface 76 moves counterclockwise past the locking pawl locking surface 72, the spring 78 pivots the locking pawl 70 clockwise from its released position to its locking position where its locking surface 72 contacts the latch locking surface 76 and holds the latch in its latched position securing the striker 29. Concomitantly with this latching, the bias of spring 58 moves the latching wedge 48 with respect to the latch so its wedging surface 52 moves into wedging contact with the striker 29 to provide the rattle free seat attachment.

While the preferred construction of the vehicle seat attachment latch assembly has been described in detail, those familiar with the art to which this invention relates will recognize various alternative designs and embodiments for practicing the invention as defined by the following claims.

What is claimed is:

1. A vehicle seat attachment latch assembly for securing and selectively releasing a member of a vehicle seat with respect to a member of a vehicle body, the vehicle seat attachment latch assembly comprising:

- an attachment bracket that is attachable to one of said members;
- a latch that is mounted on the attachment bracket for movement between: (a) a latched position where the latch captures a striker mounted on the other of said members to secure the vehicle seat with respect to the vehicle body; and (b) an unlatched position where the striker is released from the latch so the vehicle seat can be moved with respect to the vehicle body;
- a latching wedge mounted on the latch for movement therewith and for movement with respect thereto, and the latching wedge having a wedge surface for contacting the striker when the latch is in its latching position; and
- a resilient bias that biases the wedge surface of the latching wedge into wedging contact with the striker with the latch in its latching position to provide a rattle free attachment of the seat to the vehicle body.

2. The vehicle seat attachment latch assembly as in claim 1 wherein the latch has a pivotal connection for mounting thereof on the attachment bracket for pivotal movement between its latched and unlatched positions.

3. The vehicle seat attachment latch assembly as in claim 2 wherein the resilient bias comprises a spring that extends around the pivotal connection of the latch and has a first arm that extends to the latch and also has a second arm that extends to the latching wedge to provide the biasing of the wedge surface of the latching wedge into the wedging contact with the striker.

4. The vehicle seat attachment latch assembly as in claim 2 wherein the latch and the latching wedge include a pin and slot connection and a projection that cooperate to mount the latching wedge on the latch for movement with respect to the latch.

5. The vehicle seat attachment latch assembly as in claim 2 wherein the resilient bias comprises a spring that extends around the pivotal connection of the latch member and has a first arm that extends to the latch and also has a second arm that extends to the latching wedge to provide the biasing of the wedge surface of the latching wedge into the wedging contact with the striker, and wherein the latch and the latching wedge include a pin and slot connection and a projection that cooperate to mount the latching wedge on the latch for the movement with respect to the latch.

6. The vehicle seat attachment latch assembly as in claim 2 further including a locking pawl mounted on the attachment bracket for movement between a locking position for holding the latch in its latched position and a released position for releasing the latch for movement from its latched position to its unlatched position, and a spring that biases the locking pawl toward its locking position.

7. The vehicle seat attachment latch assembly as in claim 6 further including another pivotal connection that mounts the locking pawl on the attachment bracket for pivotal movement between its locking and released positions, and wherein the spring extends between the locking pawl and latch and also biases the latch toward its unlatched position.

8. The vehicle seat attachment latch assembly as in claim 1 further including another attachment bracket that is attachable to said one member to cooperate with the first mentioned attachment bracket to provide an attachment bracket assembly, each of the attachment brackets having a flange spaced from the flange of the other bracket, and the latch and latching wedge being mounted between the spaced flanges of the attachment brackets.

9. A vehicle seat attachment latch assembly for securing and selectively releasing a vehicle seat with respect to a vehicle body, the vehicle seat attachment latch assembly comprising:

- an attachment bracket assembly including a pair of attachment brackets that are attachable to the vehicle seat, and each attachment bracket having a flange spaced from the flange of the other attachment bracket;
- a latch;
- a pivotal connection that is pivotally mounts the latch on the attachment bracket assembly between the flanges of the pair of attachment brackets for pivotal movement between:
- (a) a latched position where the latch captures a striker mounted on the vehicle body to secure the vehicle seat with respect to the vehicle body; and (b) an unlatched position where the striker is released from the latch so the vehicle seat can be moved with respect to the vehicle body;
- a latching wedge mounted on the latch for movement therewith and for movement with respect thereto, and the latching wedge having a wedge surface for contacting the striker when the latch is in its latching position;
- a first spring that extends around the pivotal connection of the latch and has a first arm that extends to the latch and also has a second arm that extends to the latching wedge to provide biasing of the wedge surface of the latching wedge into wedging contact with the striker with the latch in its latched position to provide a rattle free attachment of the seat to the vehicle body;
- a locking pawl pivotally mounted on the attachment bracket assembly between the flanges of the pair of attachment brackets for movement between a locking position for holding the latch in its latching position and a released position for releasing the latch for movement from its latched position to its unlatched position; and
- a second spring that biases the locking pawl toward its locking position.

10. A vehicle seat attachment latch assembly for securing and selectively releasing a vehicle seat with respect to a vehicle body, the vehicle seat attachment latch assembly comprising:

- an attachment bracket assembly including a pair of attachment brackets that are attachable to the vehicle seat, and each attachment bracket having a flange spaced from the flange of the other attachment bracket;

a latch;

a pivotal connection that is pivotally mounts the latch on the attachment bracket assembly between the flanges of the pair of attachment brackets for pivotal movement between: (a) a latched position where the latch captures a striker mounted on the vehicle body to secure the vehicle seat with respect to the vehicle body; and (b) an unlatched position where the striker is released from the latch so the vehicle seat can be moved with respect to the vehicle body;

a latching wedge having a wedging surface;

a pin and slot connection and a projection that cooperate to mount the latching wedge on the latch for movement with respect to the latch;

a first spring that extends around the pivotal connection of the latch and has a first arm that extends to the latch and also has a second arm that extends to the latching wedge to provide biasing of the wedge surface of the latching wedge into wedging contact with the striker to provide a rattle free attachment of the seat to the vehicle body;

a locking pawl pivotally mounted on the attachment bracket assembly between the flanges of the pair of attachment brackets for movement between a locking position for holding the latch in its latching position and a released position for releasing the latch for movement from its latched position to its unlatched position; and a second spring that extends between the locking pawl and the latch to bias the locking pawl toward its locking position and to also bias the latch toward its unlatched position.

* * * * *

UNITED STATES PATENT AND TRADEMARK OFFICE

CERTIFICATE OF CORRECTION

PATENT NO. : 6,945,585 B1 
DATED : September 20, 2005
INVENTOR(S) : Hsing Lung Lewis Liu and Karl A. Murphy It is certified that error appears in the above-identified patent and that said Letters Patent is hereby corrected as shown below:

Column 6,
Line 31, after "that" delete -- is --.

Column 7,
Line 4, after "that" delete -- is --.

Signed and Sealed this

Thirteenth Day of December, 2005

JON W. DUDAS
*Director of the United States Patent and Trademark Office*